Nov. 1, 1932.                N. E. NILSSON                1,886,216
             ELECTRICAL SIGNALING AND OPERATING CIRCUIT
                    Filed June 18, 1930     3 Sheets-Sheet 1
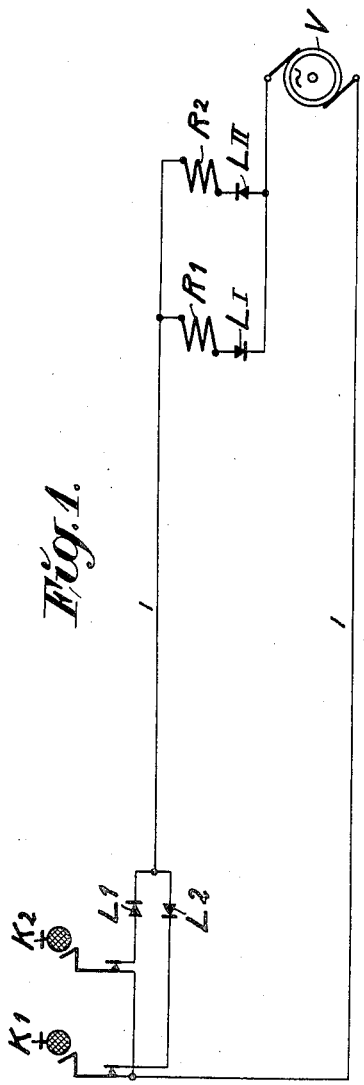
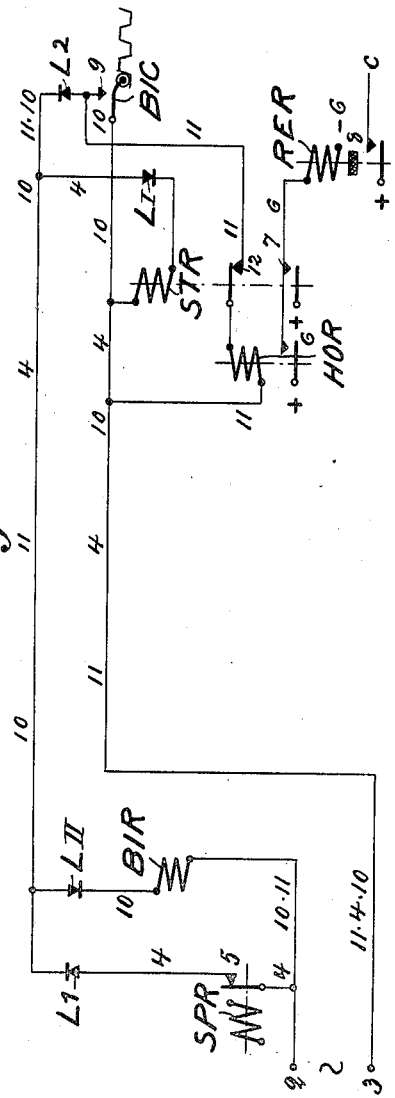
N. E. Nilsson
INVENTOR

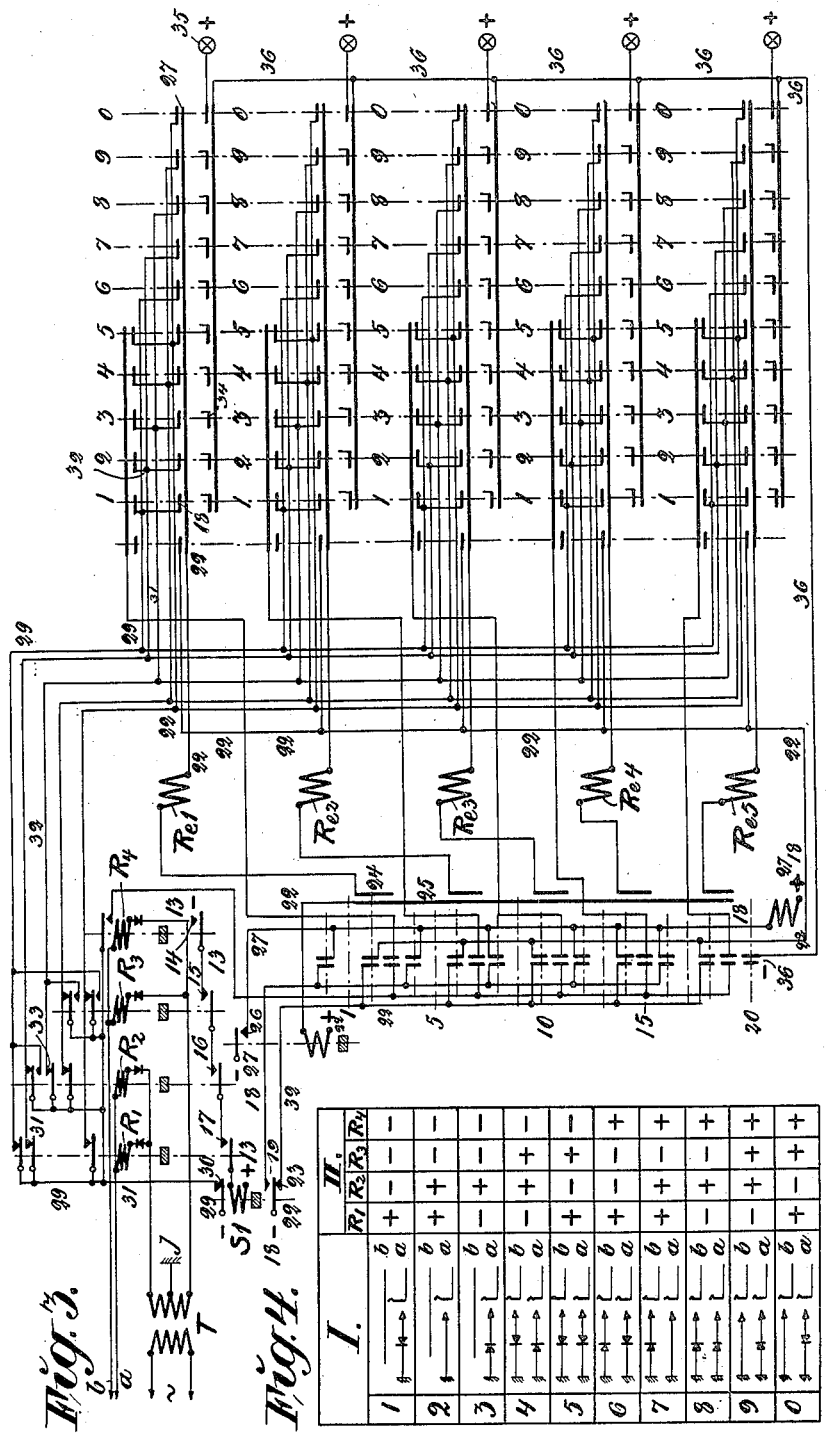

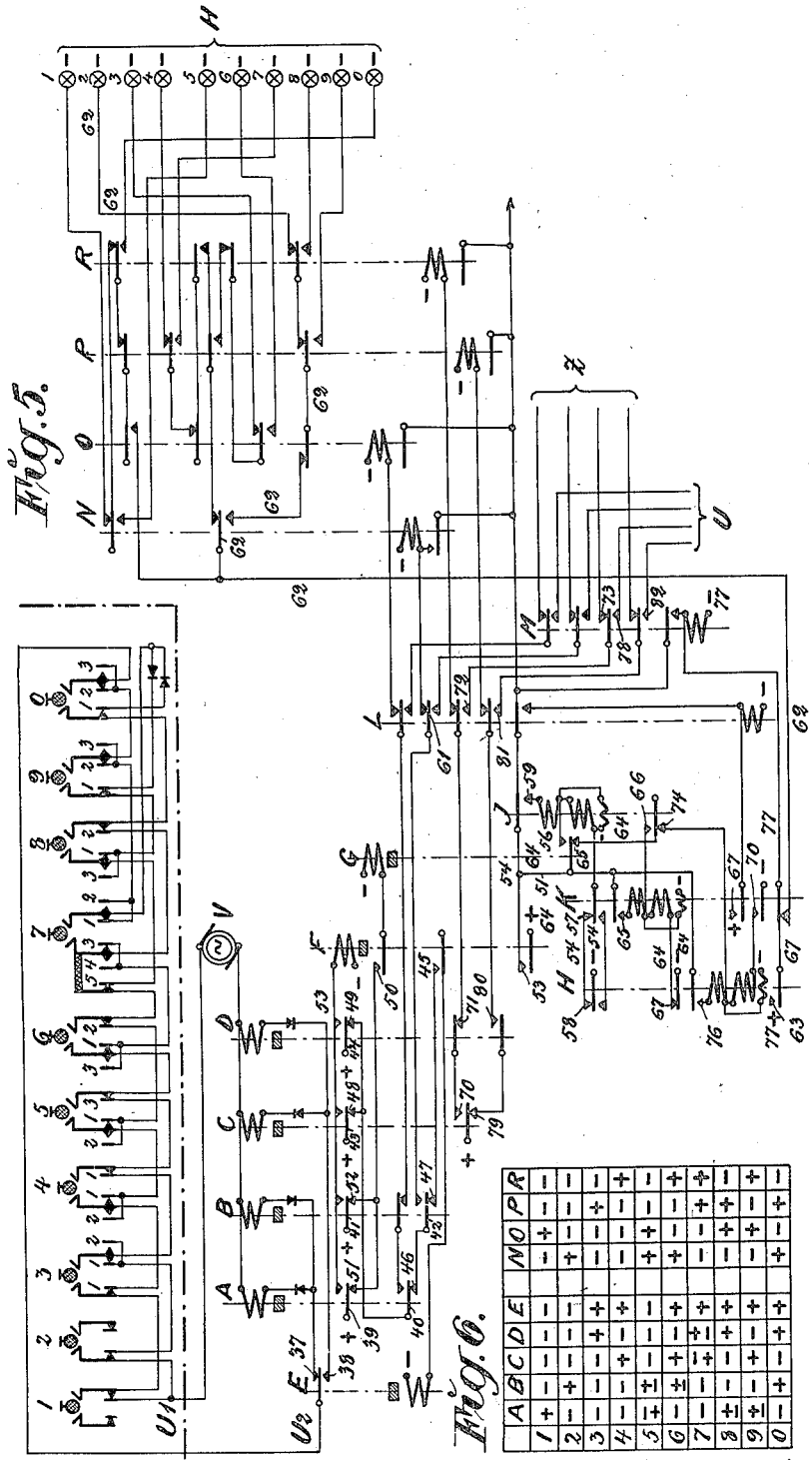

Patented Nov. 1, 1932

1,886,216

UNITED STATES PATENT OFFICE

NILS EMIL NILSSON, OF STOCKHOLM, SWEDEN, ASSIGNOR TO TELEFONAKTIEBOLAGET L. M. ERICSSON, OF STOCKHOLM, SWEDEN, A REGISTERED COMPANY

ELECTRICAL SIGNALING AND OPERATING CIRCUIT

Application filed June 18, 1930, Serial No. 462,106, and in Sweden June 21, 1929.

The present invention relates to electrical signaling or operating circuits. More especially the invention has for its object to control selectively two relays over a single wire line. It is previously known to actuate relays by means of direct current of different directions. The reversal of the current is then obtained by shifting the poles of the battery which, however, is possible only in case said poles are accessible at the operator's position. The present invention has for its object to eliminate said inconvenience and consists therein that the line branch, over which the relays are to be controlled, is provided with sending devices adapted to control said relays by converting alternating current into direct current of the one or the other direction.

The invention will be more closely described with reference to the accompanying drawings. Figure 1 illustrates the idea of the invention. Figure 2 shows an embodiment of the invention adapted for so called indirect control, by means of back impulses to the register, of the setting of selectors in automatic or semi-automatic telephone systems. Figure 3 shows another embodiment of the invention which is adapted to operate register mechanisms in automatic or semi-automatic telephone systems. Figure 4 is a table illustrating the switching operation in an arrangement according to Figure 3. Figure 5 illustrates the application of the invention in setting a relay register or a numerical selector set in automatic or semi-automatic telephone plants. Figure 6 is a table over the switching operation in an arrangement according to Figure 5. On the drawings, the relays are shown as electro-magnetic relays, but any other kind of relays may be used without receding from the idea of the invention.

The arrangement shown in Figure 1 consists of two relays $R_1$ and $R_2$ mutually parallel connected and series connected with rectifiers LI and LII, all elements being included in a line loop 1. The rectifier LI blocks the current in the one direction and the rectifier LII in the other direction. To operate the relays the line loop is provided with sending devices comprising two rectifiers $L_1$ and $L_2$ each adapted to be switched on and off by means of the keys $K_1$ and $K_2$ respectively into one branch of the line. If both buttons $K_1$ and $K_2$ take up a raised position the loop is closed for both current directions and the relays $R_1$ and $R_2$ are energized. If the button $K_1$ is pushed down the branch of the rectifier $L_2$ is interrupted and the relay $R_2$ is de-energized, whereas the relay $R_1$ remains energized. By pushing down both buttons both relays may be made inoperative.

Figure 2 shows the application of the invention in a selector controlling circuit in an automatic or semi-automatic telephone system. Only those parts of the circuits are shown which are necessary for the understanding of the invention. It is assumed that the impulse sending to the register has proceeded so far that the setting of the selectors may begin, and that the register thus has connected the alternating current source to the back impulse controlling circuit at 2 and 3. Then a direct current circuit 4 is formed over the normally closed contact 5 of the stop relay SPR, the rectifier $L_1$, the rectifier LI, the starting relay STR and through the alternating current source. The starting relay is energized and starts the selector over a contact not indicated on the drawings. At the same time a holding circuit 6 is completed for the entire connection over the normally open contact 7 of the starting relay and through the relay RER. Said relay has a normally open contact 8 of the c-wire. The selector now starts moving and effects alternately closings and openings of the normally open contact 9 by means of its back impulse contact BIC. Hereby a direct current circuit 10 is alternately closed and opened through the rectifier $L_2$, the rectifier LII, the back impulse relay BIR. In conformity herewith, the back impulse relay will be energized at even intervals of time and will actuate the register mechanism over a contact not shown on the drawings in the controlling part of the register until the selector has reached the desired position, and the circuit in the register will be completed whereby the stop relay SPR is energized. The circuit 4 is then interrupted and the starting relay STR is de-energized. The selector is then brought to stop. To prevent the de-energization of the relay RER on account of the de-energization of the starting relay, an auxiliary circuit 11 is now closed through the holding relay HOR, the normally closed contact 12 of the starting relay, the rectifier $L_2$, the rectifier LII, the back impulse relay and the alternating current source.

In Figure 3 the invention is applied to operate a register for automatic and semi-automatic telephone systems. It is assumed that the switching has proceeded so far that the calling apparatus over the talking wires $a$ and $b$ has been associated with the register. The relays $R_1$, $R_2$, $R_3$, $R_4$ intended to receive the figure combination are four in number, two and two thereof, together with the appertaining rectifier, being then each included parallelly in one line loop. On the one hand, the one of the line loops is connected to the $a$-wire and the other to the $b$-wire and, on the other, the opposite terminals are each connected to one terminal of a secondary winding of a feeding transformer earthed at its middle point. By the short-circuit of the subscriber's line, depending upon the telephone hook being raised in speaking position in the apparatus, all relays $R_1$, $R_2$, $R_3$ and $R_4$ will initially be energized. Hereby the circuit 13 is formed over the normally open contacts 14, 15, 16 and 17 of the relays. The relay $S_1$ is energized and establishes a circuit 18 over its normally open contact 19 over the normally closed contacts 20, 21 of the relay selector Re6 and to its operative magnets. The selector wipers are thereby moved into ready position 2 over the temporary position 1. (Only each fifth figure is shown on the drawings). All selectors Re1 to Re5 take up their zero positions. As soon as a digit has to be sent from the sending set of the apparatus the short-circuit is first removed whereupon the key, corresponding to the wanted digit, is immediately pushed. From Figure 4 the combination corresponding to the different digits will be readily understood. In the column I there is first shown the operation performed when pushing a key designated by a certain figure. For the Figure 1 the $a$-wire is thus earthed over a rectifier directed towards earth whereas the $b$-wire is maintained insulated. For the Figure 2 the $a$-wire is directly earthed whereas the $b$-wire is left insulated etc. In column II that relay combination is indicated which is obtained in the different operations. The sign + designates the energized condition in a certain relay whereas − designates the inoperative condition. Assuming that the figure 3 has been selected on the keys, the following circuit shiftings are obtained in the register. Upon removing the short-circuit and the subsequent earthing the $a$-branch over a rectifier having the same rectification direction as the rectifier series connected with the relay $R_2$, all relays with the exception of $R_2$ are then de-energized. The circuit 13 is then interrupted and the relay $S_1$ is de-energized. Then a circuit 22 is established over the lower, normally closed contact 23 of the relay $S_1$ over the position 2 of the register selector Re6 to the zero position of the ten thousands register selector Re1, over the wipers, through the clutch magnet of the selector Re1, over the contact 24 of the selector Re6 to the contact bar 25, and through the relay $S_2$ to the plus potential. The relay $S_2$ is energized and forms a circuit over its normally open contact 26 for the clutch magnet of the selector Re6. The register selector Re6 is brought forward over the position 3 to the position 4. The clutch magnet of the register selector Re1 is then also energized and brings the selector wipers forward to the position 1. In this position the clutch magnet is, however, still energized over the contact bar 27 the contact 28 and over the circuit 29 from the normally closed contact 30 of the relay $S_1$. The clutch magnet is then again energized and the selector wipers are brought to the position 2. In this position, as in the preceding position, current is supplied over the normally closed contact 30 of the relay $S_1$ although this time over the circuit 31. First in the position 3 the selector stops because the circuit 32, through the energization of the relay $R_2$ is interrupted at the normally closed contact 33 of said relay. By a special contact row 34 for signal lamps 35 it may be afterwards ascertained that the register selector has been correctly set. The short-circuit of the subscriber's line, preceding the next digit signal, causes in the same manner as before a forward motion of the register selector Re6 into the position 6 whereby the next figure combination will be marked on the register selector Re2 adapted for thousands. First after all the register selectors Re1 to Re5 have been set the register selector Re6 passes to the position 20 and lights over the circuit 36 the lamps corresponding to the register setting.

The arrangement shown in Figure 5 relates to an application of the invention to set a relay register or a numerical selector set in automatic or semi-automatic telephone plants. The relays A, B, C and D adapted to receive the figure combination are, together with the appertaining rectifier, parallel connected each in one of two line loops. Two corresponding terminals of said loops are over an alternating current source V connected to the one terminal $U_1$ of the sending set whereas the two other terminals 37 and 38 of the loops by means of a relay E are adapted to be alternately connected to the other terminal $U_2$ of the set. The terminal 37 is then connected to the normally closed contact of the relay E. The key 6 is numbered 1 to 10, the tenth button having the number 0. At the keys 3 to 10, small figures are also indicated by means of which the sequence of the contact closing or opening is indicated, upon pushing the key in question. Contact springs belonging to the same key and which are marked with the same figure, operate simultaneously. On the drawings only the numerical relays N, O, P and R are shown for the hundreds digit, the marking wires being designated H. By actuating the relay L one may, however, reach the tenth relays designated Z and through actuation also of M the units relays U. In Figure 6 a table is computed showing which relays $R_1$, $R_2$, $R_3$, $R_4$ are actuated when a key corresponding to a certain figure is pushed down, an energized relay being designated +, a relay in inoperative position −. If any relay shifts during the figure signaling this is marked by the sign ∓ or ±, the former for energization, the latter for de-energization. Upon sending the digits 1, 2 and 5, only the relays A and B are actuated and the relay E may thus remain inoperative. Upon sending any of the other figures the relay E must effect a shifting so that the line loop containing the relays C and D is connected to the terminal $U_2$. To control the relay E, the relays A, B, C and D are provided with contact springs 39, 40, 41, 42, 43 and 44, the springs 39, 41, 43 and 44 being then able to close an operating circuit for the relay F over corresponding normally open contacts which relay, over its normally open contact 45 together with the normally open contacts 46 and 47 of the relays A and B and any one of the normally closed contacts 48 and 49 of the relay C or D respectively, controls the operaing circuit of the relay E. The relay F is further provided with an operating contact 50 which, together with any one of the normally closed contacts 51 and 52 of the relays A or B respectively, controls the relay G. The latter relay is intended to actuate the relay L by means of the relays J, K and H, after the first figure has been selected, and the relay M, after the second figure signal has been sent. Assuming that the number 267 has to be marked on the register, the following operations will take place. The register is inoperative and the relays A and B are normally energized. To send the figure 2, the corresponding key is pushed down which results in that the rectifier branch in the sender corresponding to the relay A is interrupted. The relay A is de-energized whereas the relay B remains energized. The relay F is energized over the plus pole, the contact spring 41, the normally open contact of B, the circuit 53, the relay F, the minus pole. The relay F is energized and closes a circuit for the relay G from plus pole over the contact spring 41 of the relay B, the normally closed contact 52, the normally open contact 50 of the relay F, through the relay G to the minus pole. The relay G closes a circuit 54 over the plus pole, the normally open contact 55 of the relay F, the normally open contact 56 of the relay G through the operative winding of the relay J, over the normally closed contact of the relay K, the normally closed contact 58 of the relay H to the minus pole. The relay J is energized and is held over its normally open contact 59. The numerical relay N is now marked over the following circuit. Plus potential, normally closed contact 48 of the relay C, contact spring 40 of the relay A, the normally closed contact 46, contact spring 42 of the relay B, the normally open contact 60, over the normally closed contact 61 of the relay L, through the relay N to minus potential. The relay N is energized and prepares a circuit 62 to mark the wire having the signal lamp 2 with plus potential from the normally open contact 63 of the relay H. Before the next figure is selected the preceding key is restored to normal position. Hereby the relays A and B will again be attracted whereas the relay G is de-energized. Then a circuit 64 is closed over the normally closed contact 65 of the latter relay and the normally open contact of the relay J, through the operative winding of the relay K and the normally closed contact 67 of the relay H to minus potential. The relay K is energized and is retained over its normally open contact 68. At the same time an operative circuit for the relay L is established over its normally open contact 69 which relay is energized and shifts the receiving part of the register to the numerical relays Z corresponding to the tens digit. Upon pushing the key designated by the figure 6, the rectifier branch corresponding to the relay A is first interrupted and thereupon the branch corresponding to the relay B, whereupon the former rectifier branch is again closed. Initially the armature A and then the relay B are de-energized whereupon the operative circuit of the relay E is completed because the relay F, which is slow-acting, remains energized a while after the relay B has been de-energized. The relay E is energized, and consequently also the relay C, whereby a new holding circuit for the relay F is established. Over the normally open contact 70 of the relay C, the normally closed contact 41 of the relay D, the normally open contact 72 of the relay L, and the normally closed contact 73 of the relay M, the tens relay corresponding to the figure 6 is actuated. When the relay A was de-energized, the relay G was actuated over the normally closed contact 51 and the normally open contact 50 of the relay F, the relay G being then energized and shunting the holding winding of the relay J over the normally open contact 56, said winding being thus de-energized. Before next figure has to be selected, the key 6 is restored and the relays C and D energized whereby the relay E is de-energized. The relays A and B are energized whereas the relays C and D are de-energized. The relay G is also de-energized and forms, over its normally closed contact 65, the normally closed contact 44 of the relay J, and the normally open contact 75 of the relay K, an operative circuit for the relay H which is energized and establishes a holding circuit over its normally open contact 76. The relay M is now energized over the circuit 77 and shifts the receiving part of the register to the units relays U. Upon pushing the key designated by the Figure 7 the entire loop is first interrupted whereby the relays A and B are de-energized. Thereupon the entire loop is again closed whereas the rectifier branch corresponding to the relay is first interrupted and then closed whereby the relay C will be shifted from the de-energized to energized position. Immediately after the closing in said rectifier branch, the rectifier branch corresponding to the relay D is interrupted. The relay will thus, during the digit sending, shift from energized to de-energized position. On account of said shifting both the relay E and the relays F and G will remain energized, at the same time as two numerical relays will be actuated, the one over the normally closed contact 70 of the relay C, the normally closed contact 71 of the relay D, the normally open contact 72 of the relay L, and the normally open contact 78 of the relay M, and the other relay over the normally closed contact 79 of the relay C, the normally open contact 80 of the relay D, the normally open contact 81 of the relay L, and the normally open contact 82 of the relay M. When the relay G is energized, also the relay J is energized as before. Upon the restoration of the key, the relay G is de-energized and is connected across the holding winding of the relay K over its normally closed contact 65 and the normally open contact 66 of the relay J. The relay K is then de-energized and interrupts the operative circuit of the relay H. The relays L and M are also de-energized and the register is restored to normal position.

I claim:

1. In a circuit arrangement for alternately actuating two relays included in a line loop by means of currents of determined directions, devices consisting of two uni-directional resistances included in said line loop for sending operating currents and adapted to control said relays by converting alternating current to direct current of the one or the other direction, and means to associate said uni-directional resistances parallelly with each other to the line loop so as to block current in different directions, means to connect the one relay with the appertaining rectifier in parallel with the one sending device in the line loop, and means to connect the other relay with the appertaining rectifier in parallel with the other sending device in the line branch.

2. In a circuit arrangement for alternately actuating two relays included in a line loop by means of currents of determined directions, devices consisting of two uni-directional resistances included in said line loop for sending operating currents and adapted to control said relays by converting alternating current to direct current of the one or the other direction, means to associate said uni-directional resistances parallelly with each other to the line loop so as to block current in different directions, and relay means to actuate said sending devices.

3. In a telephone switching arrangement, a register set, a numerical selector set, sending devices comprising uni-directional resistances, a line loop, a number of relays adapted to receive the digit combination and parallel connected two and two, together with appertaining resistances and included in the one of two line branches, means to connect the one relay to the one talking line in a calling subscriber's line and the other relay to the other line, and means to connect the opposite terminals of the line branches each to one terminal of the secondary winding of a feeding transformer, said feeding transformer being earthed at its middle point.

4. In a telephone switching arrangement, a register set, a numerical selector set sending devices comprising uni-directional resistances, a line loop, a number of relays adapted to receive the digit combination and parallel connected two and two, together with appertaining resistances, means to include each relay in one of two line loops, two corresponding terminals of said branches being connected over an alternating current source to the one terminal of the sending set, whereas the two other terminals of the branches may be alternately connected to other terminals of the set.

In testimony whereof I affix my signature.

NILS EMIL NILSSON.